United States Patent
Allwright et al.

(10) Patent No.: US 7,707,217 B2
(45) Date of Patent: Apr. 27, 2010

(54) TRIE SEARCH ENGINES AND TERNARY CAM USED AS PRE-CLASSIFIER

(75) Inventors: Gareth Edward Allwright, St. Albans (GB); Eugene O'Neill, Dublin (IE); Tin Lam, London (GB); Kam Choi, Tring (GB); Francisco Valentin Aquino, Marlborough, MA (US)

(73) Assignee: 3Com Corporation, Marlborough, MA (US)

( * ) Notice: Subject to any disclaimer, the term of this patent is extended or adjusted under 35 U.S.C. 154(b) by 817 days.

(21) Appl. No.: 11/041,629

(22) Filed: Jan. 24, 2005

(65) Prior Publication Data

US 2006/0167843 A1 Jul. 27, 2006

(51) Int. Cl.
*G06F 17/30* (2006.01)
(52) U.S. Cl. .................... 707/758; 707/E17.012
(58) Field of Classification Search ............... 707/10, 707/101, 104.1, E17.012, E17.033, E17.037; 711/108, 117, 202, 219
See application file for complete search history.

(56) References Cited

U.S. PATENT DOCUMENTS

| 6,298,340 | B1 * | 10/2001 | Calvignac et al. ............ 707/3 |
|---|---|---|---|
| 6,867,991 | B1 * | 3/2005 | Tezcan et al. ............ 365/49.16 |
| 7,139,867 | B2 * | 11/2006 | Feldmeier et al. ........... 711/108 |
| 7,313,666 | B1 * | 12/2007 | Saminda De Silva et al. ............. 711/173 |
| 2003/0110180 | A1 | 6/2003 | Calvignac et al. |
| 2004/0109451 | A1 * | 6/2004 | Huang et al. ................. 370/392 |
| 2004/0153460 | A1 * | 8/2004 | Corl et al. .................... 707/100 |
| 2004/0249803 | A1 * | 12/2004 | Vankatachary et al. ......... 707/3 |
| 2006/0155915 | A1 * | 7/2006 | Pereira ....................... 711/100 |

FOREIGN PATENT DOCUMENTS

WO WO 2004/114611 A3 12/2004

* cited by examiner

*Primary Examiner*—Leslie Wong

(57) ABSTRACT

A method performs a lookup on a search key word, employing a trie database including multiple trie blocks that include pointers to other trie blocks. Each trie is accessible by means of a segment of the search key. A selected section of the search key word is applied to a content addressable memory. In the event of an absence of a match of the selected section with an entry in the content addressable memory, a trie search is performed on the whole search key word. In the event of a match of the selected section with an entry in the content addressable memory, a partial trie search is performed, commencing with a first segment of the search key word after the selected section that has been matched in the content addressable memory.

6 Claims, 4 Drawing Sheets

Figure 5
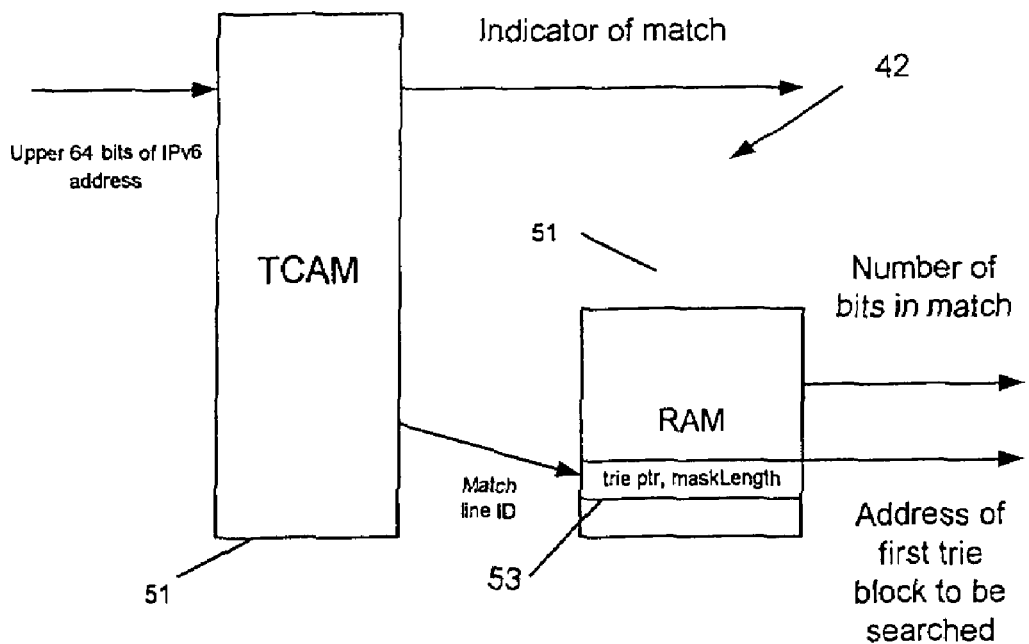
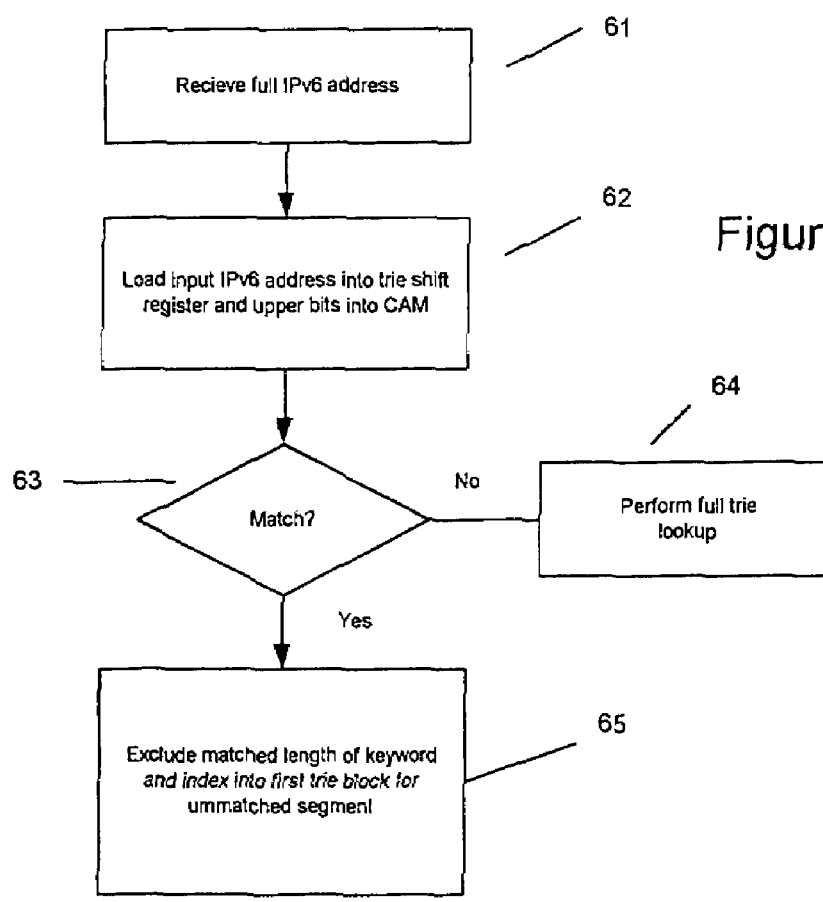
Figure 6

TRIE SEARCH ENGINES AND TERNARY CAM USED AS PRE-CLASSIFIER

FIELD OF THE INVENTION

This invention relates to network units such as switches and routers for use in packet-based communication systems and to search engines for such units. More particularly the invention concerns search engines which are employed to look up network addresses in an address database, so as to obtain, for example, forwarding data for a packet from which the network address has been extracted. The invention more particularly concerns the use of trie search engines for address lookups

BACKGROUND TO THE INVENTION

An activity which is fundamental to the operation of a packet-switched communication system is a search in a database for an entry corresponding to an input key. This is required for many purposes. One is to obtain forwarding data for a packet so that the packet can be forwarded from the appropriate port or ports of a switch or router. Such forwarding data may constitute all or part of the data 'associated' with an entry corresponding to the input key; the input key may be a network destination address extracted from an addressed packet.

Different kinds of search engine exist for the performance of searches of this nature. One kind comprises a content addressable memory (CAM) which can test an input key simultaneously against a multiplicity of stored words. A principal disadvantage of CAMs is their high power consumption, which tends to restrict the number of addresses that can in practice be stored. Another is a hashing engine which reduces a search word to a much shorter word, which indexes a database. Since different search keys can be hashed to the same (shorter) word, it is necessary to test each entry for a full match with the search word and to provide links between entries corresponding to the same hash. A third, and quite versatile, kind is a multi-way tree search engine, called usually a trie search engine, which at each intermediate stage of a search provides a pointer specifying the address of a block of entries (sometimes called 'node') but does not distinguish between those entries. Such a block is accessed at the next stage of the search and the segment of the key which is employed in that stage obtains a particular entry within the block and so on until the search reaches an entry which indicates completion of the search. Completion may be signified by access to 'associated data' (such as forwarding data) or by termination of the search as unsuccessful. Although trie search engines have no inherent limitation on their size and can provide different search strategies, their disadvantage is the number of cycles or stages they need to complete a search.

Typically a trie search employs either four or seven bits at each stage. Whether the search strategy employs four bits or seven bits at each stage depends on whether one desires a faster search or a slower more versatile search.

If, for example a trie search is performed for a host address conforming to Internet Protocol version 4 (IPv4) and having therefore 32 bits, a full trie search requires at most five stages if seven bits are used at each stage.

However, a trie search engine which is required to perform a corresponding search for a host address conforming to Internet Protocol version 6 (IPv6), having therefore 128 bits, would require 19 cycles to complete using key segments of seven bits and 32 cycles to complete using key segments of four bits. Such a number of cycles would make a trie search undesirable for long search keys such as destination addresses conforming to IPv6.

SUMMARY OF THE INVENTION

The object of the invention is to improve trie searching for long keys, such as IPv6 addresses.

The present invention is based on the use of a ternary CAM as a pre-classifier, i.e. to assist a trie search by bypassing the initial sections of the trie access. These sections for an IPv6 address, mainly comprises the 'aggregator address bits'. These aggregator address bits comprise the Top Level Aggregator (TLA), which is used by the long haul ISPs, the Next Level Aggregator (NLA), which identifies a customer's site, and finally the Site Level Aggregator (SLA) which identifies individual subnets within a site. The remainder of the IPv6 address is the Interface ID, which indicates a specific interface on a subnet.

The CAM is preferably used to match the upper bits of the address with the intention that a trie search on an address within a subnet can be shortened to 64 bits. The CAM is preferably a ternary CAM wherein the length of a comparison mask within the CAM may be programmable to allow the CAM to include SLA or NLA sections of the address in the trie search. The storing of CAM content could be designed so that the CAM is operated to store the most recently accessed addresses. For maximum versatility, any entry of the cached CAM could be programmed to store a permanent value, thus allows some important addresses to be permanently stored.

A successful search of the CAM would return a trie pointer and a value which indicates the number of bits in the trie key that can be skipped in the trie search. The trie pointer would indicate the next trie-block in the trie chain, i.e. the address of the first trie block which will be accessed using the first non-bypassed segment of the search key.

This scheme has two benefits. The first of these is that it shrinks the overall search time when an IPv6 address is being subject to a lookup, thereby increasing the overall performance of the system. Secondly, the number of trie node required is reduced by virtue of being able to skip the upper bits of the search key.

BRIEF DESCRIPTION OF THE DRAWINGS

FIG. 5 illustrates a detail of the search engine

FIG. 6 is a flow diagram illustrating the method of searching according to the invention.

DETAILED DESCRIPTION

Figure 1:
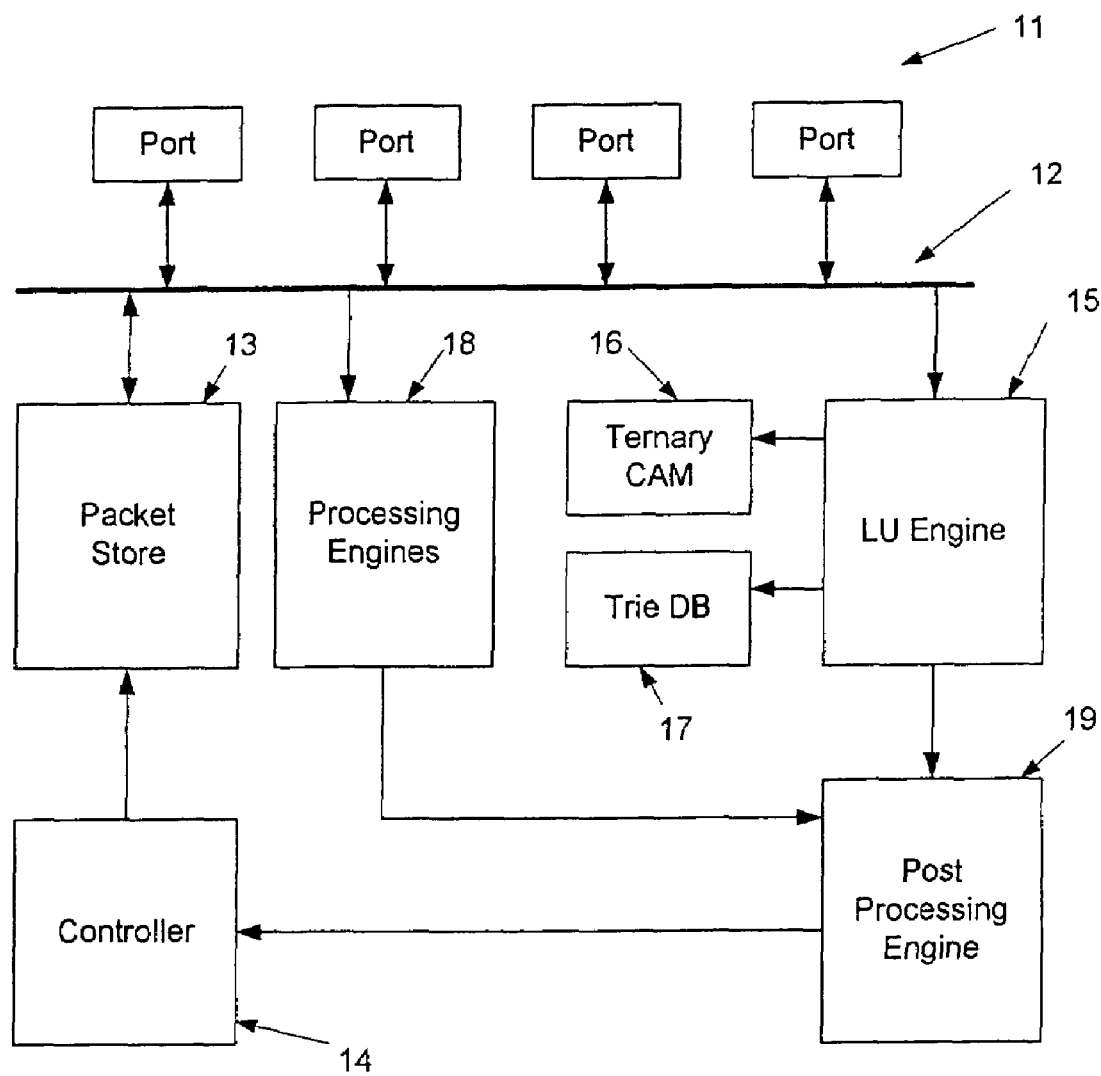
FIG. 1 is a simplified schematic drawing of a network unit incorporating the invention.

Although the particular organization or architecture within which the invention may be embodies is not important, FIG. 1 illustrates schematically and in greatly simplified manner a network unit such as a switch in order to provide a typical context for an embodiment which will be described in more detail later.

FIG. 1 shows a multiport network unit which has a multiplicity of ports 11 by which addressed data packets (for example conforming to TCP/IPv6) can be received and from which such packets after appropriate examination and possible processing can be forwarded to other network units or to end users (hosts). Communication between the various parts of the unit is by was of a system of buses which are schematically illustrated by a single bus 12.

When a packet is received and allowed to enter the unit, it is stored temporarily in a packet store 13 while a lookup is performed to determine the forwarding data for the packet. In a typical example the forwarding data is ultimately represented by a bit mask which identifies to a link controller 14 the port or ports from which the packet should be forwarded. The forwarding data depends or may depend on a variety of information but the main source is usually the destination address contained in the header of the packet. This destination address is extracted and subjected to an address lookup by means of a lookup (LU) engine 15, which has recourse to a lookup database. As noted above such a database may assume a variety of different forms. In the present example, the database is partly constituted by a ternary content addressable memory (TCAM) 16 and partly by a trie database (DB) 17.

The result of the lookup is normally a provisional portbit-mask which in the absence of other considerations would identify the egress port or ports. It is customary to include other processing engines 18 which may for example include rules engines, spanning tree engines, monitoring, metering or other engines that would modify the forwarding data or even in some cases prescribe discard of the packet. The actions prescribed by the lookup engine 15 and the other processing engines 18 are collated by a post-processing engine 19 which will determine a final action to be executed by the controller 14.

Figure 2:
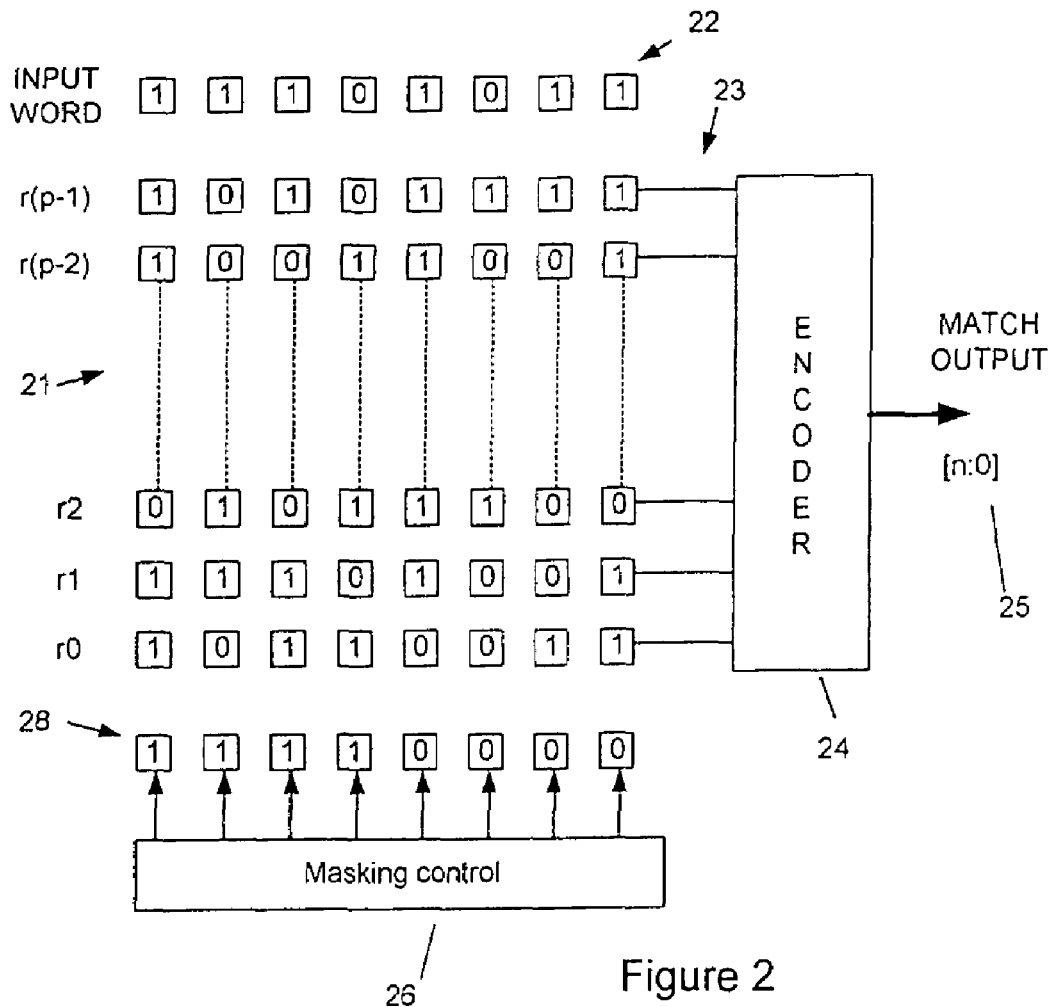
FIG. 2 is a schematic drawing of a ternary content addressable memory.

FIG. 2 is a simplified schematic drawing of a CAM of the kind intended for use in the present invention.

The CAM comprises an array of cells 21 organized in rows denoted r0, r1 . . . r(p−2) and r(p−1), each row being capable of storing a digital word. In the example shown each word comprises eight bits but in a practical example (as described later) each word may be 64 bits wide and will be the 'top' 64 bits of a network address conforming to IPv6. The number of rows (p) is at the choice of the designer, but typically there may be $2^7$, i.e. 128 rows as in the later example.

A CAM is organized with pairs of column lines (not shown) by means of which an input word 22 can be compared simultaneously with all the entries in the CAM. If there is a match between the content of the input word and the content of an entry the relevant one of the row lines 23 indicates a match. This is preferably encoded by means of an encoder 25 into a coded output 25. In the example, the match output can be encoded into an output of 7 bits to identify the matching entry.

As thus far described the CAM would be a binary CAM which would require an exact match of all the bits of an input word. In the example, which has purely arbitrary words in the CAM rows, the (arbitrary) input word [1101011] is not matched by any entry in the CAM.

The CAM is preferably a ternary CAM of which a selectable number of row bits can be masked by means of a masking control 26 so that they are disregarded in the comparison. This is equivalent to setting the bits to a 'don't care' state. In the example the last four of the eight bits are to be masked, so that the top four bits only are unmasked and therefore there is a match between the input word [11101011] and the word, effectively [1110xxxx] in row r1, where x represents 'don't care'.

As will be explained with reference to FIG. 4, a CAM is preferably employed according to the invention as a pre-classifier for a trie search. In the specific example to be described, the CAM is wide enough to embrace a substantial part of the width of a search key. In particular it is 64 bits wide and may therefore store the top 64 bits of a key word, e.g. an IPv6 address. The CAM may be programmed so that when it is becomes full the least recently used entry is removed in favour of the most recent entry.

As is explained with reference to FIG. 5, the pre-trie CAM comprises a ternary CAM and an associated memory such as a random access memory (RAM).

Figure 3:
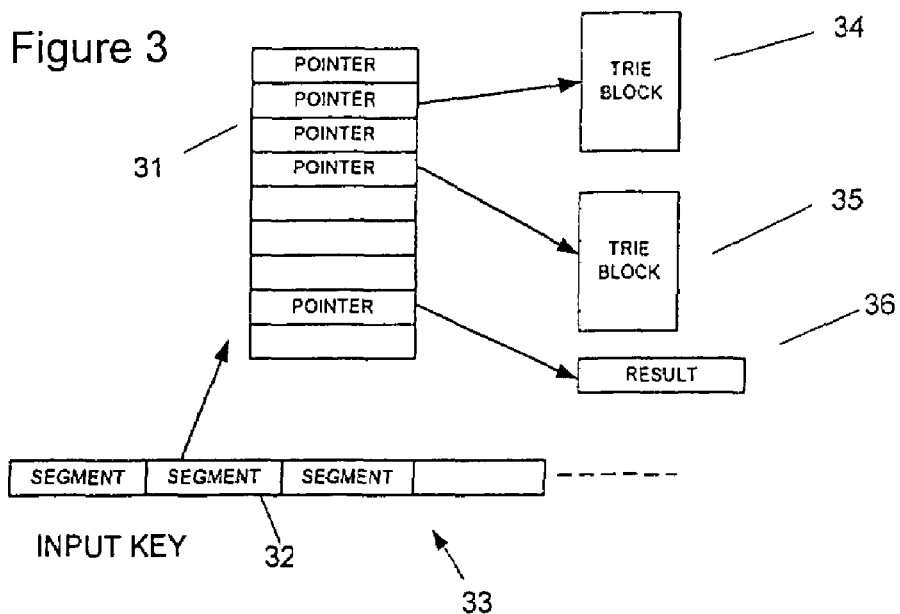
FIG. 3 is a schematic drawing illustrating a trie database.

FIG. 3 illustrates in a simplified manner the relationship between the essential elements of a trie database and an input key.

Trie databases are for example described in U.S. Pat. No. 6,337,862 issued to O'Callaghan et al, U.S. Pat. No. 6,763,348 to O'Keeffe et al and U.S. Pat. No. 6,804,230 to Jennings et al, all assigned to 3Com Corporation; and the present invention may be used with any of the trie structures disclosed in those patents.

A trie database as described in any of the aforementioned patent is composed of a multiplicity of 'blocks' or nodes, each of which has a multiplicity of entries. Each entry includes a pointer and may include other information such a status field and an index field (as described in the O'Keeffe U.S. Pat. No. 6,763,348). One such block is the block 31 in FIG. 3 and is shown as containing only pointers for the sake of simplicity. A trie block has an address in memory; this address is common to all the entries in the block. Within a block a pointer has to be selected by recourse to the next selected segment 32 of the search key 33, which in this example is part of the network address that is the subject of the lookup. Some of the pointers point to respective blocks, such as the blocks 34 and 35; some will point to or define a result 36, which may be associated data in a respective address in a RAM. Alternatively or additionally an entry may define a null result (i.e. the search is unsuccessful).

In some trie databases the block size is fixed. However in the Jennings et al U.S. Pat. No. 6,804,230 the block size can be changed and the size of the next block in the search be defined by a size field in the respective entry. The specific example described later employs such as system and can employ a block size which requires either a four bit segment or a seven bit segment for selection of the pointers within a block. However, the invention may be employed in a scheme such as described in the O'Keeffe U.S. Pat. No. 6,763,348, wherein the next segment of the search key is defined within a trie entry, rather than be a shift register that holds the bits of the search key.

As explained previously, although a trie database is useful in network units because it can hold a very large number of searchable addresses, the search time for long keys, assuming reasonable adaptability of the search strategy, can become excessive, and the invention is particularly intended to alleviate the disadvantage of a large number of search cycles when the key word, e.g. a host address, has of the order of 128 bits as in the example of an address conforming to IPv6.

Figure 4:
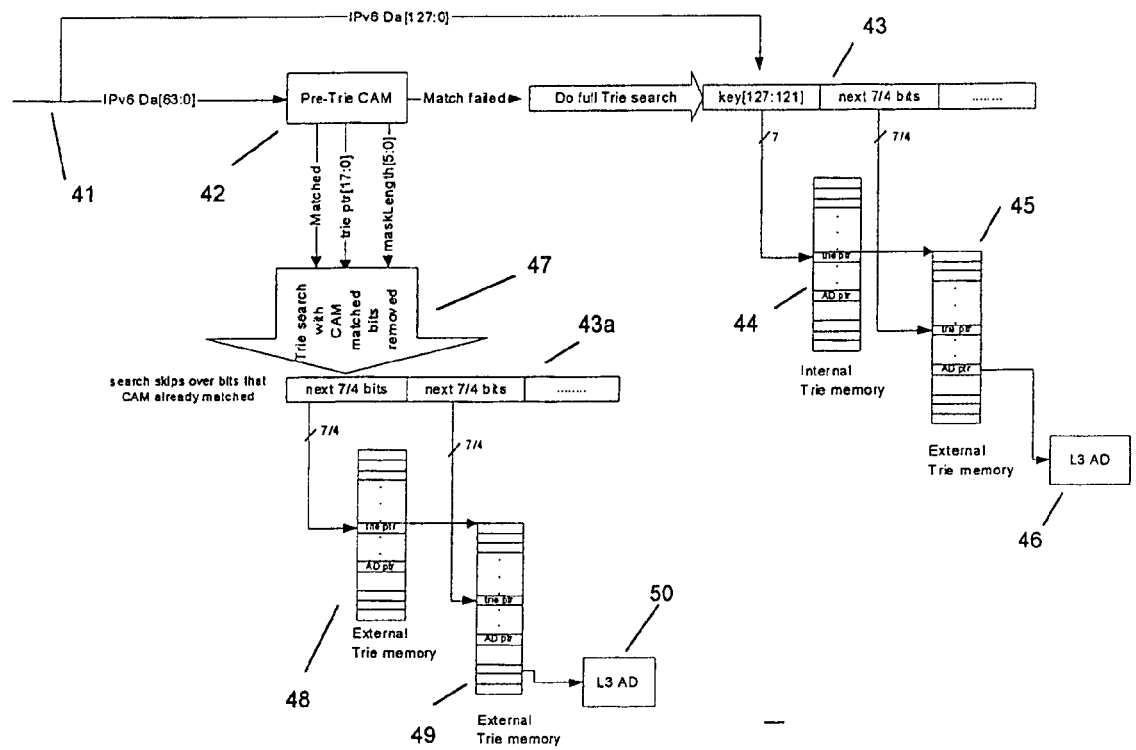
FIG. 4 illustrates schematically the organization and operation of a search engine according to the invention.

FIG. 4 illustrates the organization of the search engine, the pre-trie CAM and the trie database according to the invention. FIG. 5 illustrates the inputs and outputs of the pre-trie CAM and FIG. 6 is a flow diagram showing the stages of a search.

The search engine receives (FIG. 6 stage 61) the full 128 bits of the IPv6 address [127:0] at an input 41. It applies the top sixty-four bits [127:64] to a 'pre-trie' CAM 42. It also applies the full input address word [127:0] to a shift register 43. This shift register is organized to cooperate with the trie database (of which only two blocks 44 and 45 are shown) to perform an ordinary trie lookup in blocks of four or seven bits according to the search strategy. The full trie search (if performed) is shown in simplified form as accessing from the first segment of the search key a trie pointer in a root node or block 44 to select block 45. The next segment of the search key accesses a specific pointer in the block 45.

In this example, block 45 is shown as having in one entry a trie pointer, which would point to the address of another block (not shown) and an 'AD ptr', i.e. an associated data pointer which points to an entry in a secondary database, that entry including the 'associated data' and specifically the L3 AD, the forwarding data associated with the network address. In this example a search result is shown (for simplicity) after only two stages of the trie search; but in general many more stages would be required.

The full trie search is only required, and therefore only enabled, if there is no match found between a selected plurality of 'upper' bits of the search key with an entry in the TCAM 42.

The input to the pre-trie CAM 42 is the upper sixty-four bits of the IPv6 address (FIG. 6, stage 62). As noted above the upper bits of the IPv6 address comprise the aggregator address bits, primarily the top level aggregator (TLA), which distinguishes between ISPs (Internet Service Providers), the 'next level aggregator' (NLA), which normally identifies a customer's site and the site level aggregator (SLA) which identifies sub-nets within a site. Whether the masking allows the trie search to include part of the SLA and NLA sections is a matter of preference and possibly operating circumstances.

FIG. 5 illustrates the pre-trie CAM 42. In this embodiment it comprises a ternary CAM 51 which receives the top 64 bits of the input key. In the event of a match the match line output accesses the relevant entry in the associated random access memory 52. The relevant entry 53 in the RAM contains a trie pointer (in this embodiment an eighteen bit word) and an indicator of the mask length that was employed in the ternary CAM (and therefore the number of bits that are required for a match in the ternary CAM). The mask length is part of the relevant entry in the RAM and is output as the six-bit word 'maskLength'.

Thus a successful search (FIG. 6, stage 63) in the CAM yields, as shown in FIG. 5, three outputs. One is an indicator that a match has been obtained. If this indicator is (at a relevant clock cycle) invalid, the full trie search is enabled (stage 64, FIG. 6), and is performed as described above. A second output is a trie pointer identifies the address of the first trie block which is to be accessed in the first stage of the partial trie search, i.e. the first block which relates to a unmatched segment of the search key. A third output is the mask length word 'maskLength' which is used to index into the search key and particularly to identify the start of the segment of the search key to be used as the next segment after all those corresponding to the previously matched segments (stage 65, FIG. 6).

To provide a numerical example, suppose that the top 64 bits of the IPv6 address are loaded into the CAM. The CAM's mask length is (just for example) 16 bits, so that the CAM searches for a match on the top 48 bits. If a match is obtained, the ternary CAM accesses the relevant entry in the RAM, which provides a pointer to a trie block and a maskLength which indicates that 16 bits were masked and that therefore the top 48 bits [127:80] were used to obtain a match. This mask length enables the trie search to start at the 49$^{th}$ bit (bit 79); the trie block to be selected is one which pertains to the next segment (7 bits or 4 bits in the specific example) of the key. This segment consists of bits [79:73] for a seven-bit first segment and bits [79:76] if a four-bit first segment is used. Which trie block is identified by the trie pointer depends on the search. It will be understood that a trie search is a multi-way search and there may be several blocks that are accessible from this segment. In a normal trie search the trie block now examined would have been determined by the pointer obtained from the previous trie stage in a full trie search.

The result of the pre-trie matching (stage 63, FIG. 6) is shown by the broad arrow 47 in FIG. 4. The first block to be accessed in the partial trie search is shown as the block 48 The block 48 is accessed using the first unmatched segment of the search key 43a to obtain a pointer which points to the next block 49. In the example, the search proceeds in the same way as the trie search described above and yields a result shown as L3 AD 50.

In FIG. 4, the trie block 44 is annotated with the caption 'Internal trie memory' whereas blocks 45, 48 and 49 are captioned with 'External trie memory'. This is intended to exemplify the practice of providing some memory space (usually a lesser proportion) on the operating chip and the remainder of the memory in a separate memory chip. It is not intended to restrict the manner in which the invention may be implemented.

The invention claimed is:

1. A method of performing a lookup on a search key word, employing both a ternary content addressable memory and a trie database stored in random access memory (RAM) comprising a multiplicity of trie blocks that include pointers to other trie blocks, wherein each trie is accessible by means of a segment of said search key, the method comprising:
   applying a selected section of the search key word to a ternary content addressable memory;
   in the event of an absence of a match of said selected section with an entry in the ternary content addressable memory, performing a search on the whole of said search key word in a trie database stored in random access memory (RAM); and in the event of a match of said selected section with an entry in the ternary content addressable memory, performing a partial search of the trie database stored in RAM commencing with a first segment of said search key word after said selected section that has been matched in the ternary content addressable memory.

2. A method as in claim 1 and further comprising applying to the ternary content addressable memory a comparison mask which delimits said selected section; and excluding from the partial search of the trie database that part of the search key which corresponds to said selected section as delimited by said comparison mask.

3. A method as in claim 1 wherein the search key comprises at least 128 bits.

4. A method as in claim 1 wherein the search key comprises a network address conforming to Internet Protocol version 6.

5. A method of performing a lookup on a search key word, employing both a ternary content addressable memory and a trie database comprising a multiplicity of trie blocks that include pointers to other trie blocks, wherein each trie is accessible by means of a segment of said search key, the method comprising:

applying a selected section of the search key word to a ternary content addressable memory;

in the event of an absence of a match of said selected section with an entry in the ternary content addressable memory:

performing, in a trie database stored in random access memory (RAM), a search on the whole of said search key word; and in the event of a match of said selected section with an entry in the ternary content addressable memory:

accessing from said ternary content addressable memory an associated random access memory to obtain outputs that define a partial search in the trie database commencing with a first segment of said search key word after said selected section that has been matched in the ternary content addressable memory.

6. A method as in claim 5 and further comprising applying to the ternary content addressable memory a comparison mask which delimits said selected section; and obtaining from said random access memory an indicator which identifies that part of the search key which corresponds to said selected section as delimited by said comparison mask.

* * * * *